US011385948B1

(12) United States Patent
Livneh et al.

(10) Patent No.: US 11,385,948 B1
(45) Date of Patent: Jul. 12, 2022

(54) DISTRIBUTED DATABASE EXCEPTION HANDLING

(71) Applicant: Amazon Technologies, Inc., Seattle, WA (US)

(72) Inventors: Danielle Livneh, Seattle, WA (US); Almero Gouws, Seattle, WA (US); Derek William Richard Chen-Becker, Centennial, CO (US); Stefano Stefani, Issaquah, WA (US); Akshat Vig, Seattle, WA (US); Zoe Wheeler, Seattle, WA (US); Lakshmi Narasimha Guptha Munuhur Rajagopal, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/698,491

(22) Filed: Nov. 27, 2019

(51) Int. Cl.
*G06F 11/00* (2006.01)
*G06F 11/07* (2006.01)
*G06F 16/27* (2019.01)

(52) U.S. Cl.
CPC ...... *G06F 11/0709* (2013.01); *G06F 11/0769* (2013.01); *G06F 11/0784* (2013.01); *G06F 16/27* (2019.01)

(58) Field of Classification Search
CPC ............. G06F 11/0769; G06F 11/0709; G06F 11/0784; G06F 16/27
See application file for complete search history.

(56) References Cited

U.S. PATENT DOCUMENTS

| 5,909,215 | A  | * | 6/1999  | Berstis    | G06F 11/0769 |
|-----------|----|---|---------|------------|--------------|
|           |    |   |         |            | 715/781      |
| 7,165,202 | B2 | * | 1/2007  | Eatough    | G06F 11/0709 |
|           |    |   |         |            | 714/57       |
| 7,877,640 | B2 | * | 1/2011  | Schmelter  | G06F 9/542   |
|           |    |   |         |            | 717/124      |
| 8,448,024 | B2 | * | 5/2013  | Kumar      | G06F 11/34   |
|           |    |   |         |            | 714/48       |
| 9,069,665 | B2 | * | 6/2015  | Murphy     | G06F 11/0709 |
| 9,223,673 | B1 | * | 12/2015 | Shamis     | H04L 41/0686 |

(Continued)

OTHER PUBLICATIONS

2019 Revised Patent Subject Matter Eligibility Guidance Appendix 1 pp. 30-41 (Year: 2019).*

(Continued)

*Primary Examiner* — Jonathan D Gibson
(74) *Attorney, Agent, or Firm* — Davis Wright Tremaine LLP

(57) ABSTRACT

A distributed database system maintains data for a database client by storing data on a plurality of storage nodes. Upon receiving a request from the database client in a first format, the database system translates the request to a second format and sends the translated request to a storage subsystem. The storage subsystem generates an exception if the translated request cannot be successfully completed. The distributed database system resends the translated request on behalf of the database client if the exception corresponds to a request that can be retried, and continues to resend the translated request until a first of an expiration of a predetermined time period or until the request completes successfully. The distributed database system sends a response to the database client based on the resent database request.

22 Claims, 7 Drawing Sheets

(56) References Cited

U.S. PATENT DOCUMENTS

| | | | | |
|---|---|---|---|---|
| 9,477,728 | B2* | 10/2016 | Arthanat | G06F 16/25 |
| 10,558,514 | B2* | 2/2020 | D | G06F 11/0787 |
| 2002/0184589 | A1* | 12/2002 | Eatough | G11B 20/18 |
| | | | | 714/746 |
| 2003/0167406 | A1* | 9/2003 | Beavers | G06F 11/0709 |
| | | | | 726/22 |
| 2005/0257098 | A1* | 11/2005 | Andrews | H04L 41/06 |
| | | | | 714/43 |
| 2006/0167875 | A1* | 7/2006 | Joe | G06F 9/548 |
| 2012/0204068 | A1* | 8/2012 | Ye | G06F 11/0769 |
| | | | | 714/57 |
| 2013/0036407 | A1* | 2/2013 | Zheng | G06F 11/0781 |
| | | | | 717/135 |
| 2013/0185592 | A1* | 7/2013 | Fleming | G06F 11/079 |
| | | | | 714/E11.178 |
| 2017/0139760 | A1* | 5/2017 | Rahman | G06F 11/0772 |
| 2019/0073257 | A1* | 3/2019 | Dasgupta | G06F 16/258 |
| 2019/0361767 | A1* | 11/2019 | Karthik | G06F 11/1469 |

OTHER PUBLICATIONS

The Apache Software Foundation, Cassandra: CQL Binary Protocol v3, 19 pages, https://git-wip-us.apache.org/repos/asf?p=cassandra.git;a=blob_plain;f=doc/native_protocol_v3.spec, Accessed on: Apr. 16, 2020.

Amazon Web Services, Inc., Error Handling with DynamoDB, 7 pages, https://docs.aws.amazon.com/amazondynamodb/latest/developerguide/Programming.Errors.html#Programming.Errors.MessagesAndCodes, Accessed on Apr. 16, 2020.

* cited by examiner

| Status Code | Exception Name | Retry | Parse | Additional Check | Error Code | Error Name |
|---|---|---|---|---|---|---|
| 400 | ProvisionedThroughputExceeded | Y | N | N | 0x1200 | Read Timeout |
| 400 | ProvisionedThroughputExceeded | Y | N | N | 0x1100 | Write Timeout |
| 400 | ValidationException | N | Y | N | 0x2400 | Already Exist |
| 400 | ValidationException | N | Y | N | 0x2200 | Invalid |
| 400 | ValidationException | N | Y | N | 0x2000 | Syntax_Error |
| 400 | AccessDeniedException | N | N | N | 0x2100 | Unauthorized |
| 400 | ResourceInUseException | N | N | Y | 0x2400 | Already_exist |
| 400 | ResourceNotFoundException | N | N | Y | 0x2200 | Invalid |
| 400 | RequestLimitExceeded | Y | N | N | 0x1200 | Read timeout |
| 400 | RequestLimitExceeded | Y | N | N | 0x1100 | Write timeout |
| 400 | RequestLimitExceeded | Y | N | N | 0x1001 | Overloaded |
| 500 | Internal Server Error | Y | N | N | 0x0000 | Server Error |
| 503 | Service Unavailable | Y | N | N | 0x0000 | Server Error |
| 400 | LimitExceededException | Y | N | N | | |

FIG. 3

DISTRIBUTED DATABASE EXCEPTION HANDLING

BACKGROUND

Distributed database systems may be called upon to provide scalable and reliable access to data. In some distributed database systems, exceptions may be generated when a request made by a database client cannot be completed successfully. In some cases, an account holder may wish to migrate a database to a distributed database system that generates exceptions in a different format than that expected by a current database driver. Migrating a database in such cases can require significant effort to recode the database driver for operation with the new database to support the new exception format. Improvements to exception handling could be made.

BRIEF DESCRIPTION OF THE DRAWINGS

Various techniques will be described with reference to the drawings, in which:

FIG. 3 illustrates an example of an error map, in accordance with at least one embodiment;

DETAILED DESCRIPTION

In an example of a distributed database system, data is maintained by the distributed database system on behalf of a plurality of clients. Some of the clients may have migrated to the distributed database system from a previous database system that uses a different error format than exceptions generated by the distributed database system. An error handler that translates the new error format to the previous error format may allow clients to more easily migrate to the distributed database system without having to entirely rework their client driver. The error handler may also perform actions on behalf of the clients, such as by determining whether an error received from a storage subsystem corresponds to a request that can be retried, and resending the request on behalf of the client. For example, the error handler may continue to resend the request until a first of an expiration of a predetermined time period or successful completion of the request. The predetermined time period may be selected to correspond to an expected request timeout period of the client. The error handler may send a response to the client based on the resent request. The response may indicate successful completion of the request when the resent request is successful. The response may be an error message translated into a format expected by the client if the resent request does not complete successfully. In some cases, such as some forms of transient errors that have no corresponding expected error on the client side, the error handler may not send a response.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

As one skilled in the art will appreciate in light of this disclosure, certain embodiments may be capable of achieving certain advantages, including those related to exception and error handling. In particular, the technical field of distributed database exception handling is improved by the provision of techniques, embodiments of which are described herein, for resending a request on behalf of a client in response to exceptions that correspond to requests that can be retried, and for translating exceptions from a first format to error messages in a second format.

Figure 1:
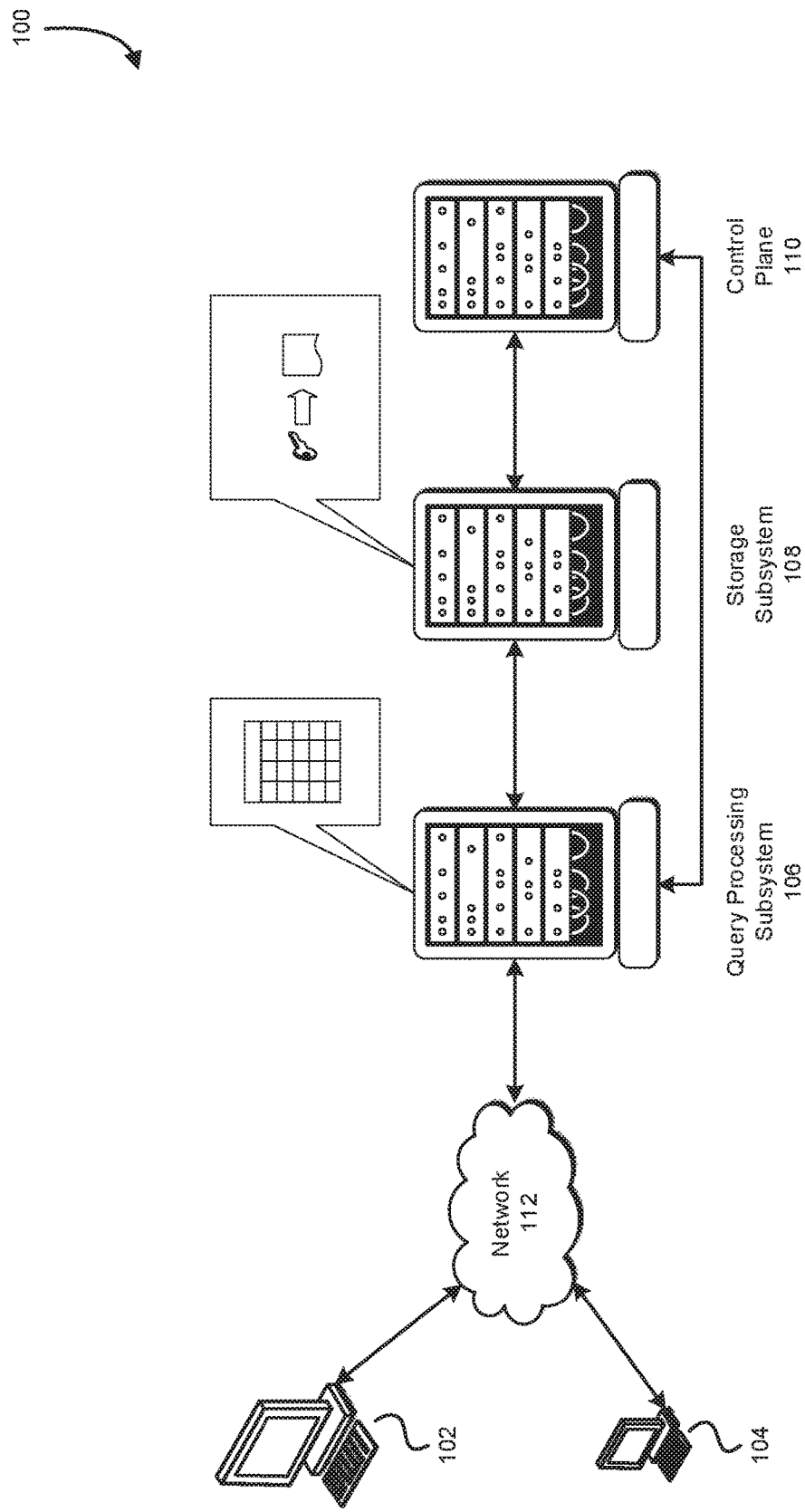
FIG. 1 illustrates an example distributed database system, in accordance with at least one embodiment.

FIG. 1 illustrates an example distributed database system, in accordance with at least one embodiment. In the example of FIG. 1, a distributed database system 100 is a multi-tenant database system, capable of storing data on behalf of a plurality of clients 102, 104. The distributed database system 100 may be described as multi-tenant because data maintained by the system 100 on behalf of one client 102 is not generally visible to another client 104.

In the example of FIG. 1, the distributed database system 100 comprises a query processing subsystem 106, storage subsystem 108, and control plane 110.

A client 102, 104 may comprise a computing device, computing process, hosted computing service, and so forth. A client, as used herein, generally refers to a client device associated with a particular entity, such as a customer of a hosted distributed database service. In at least one embodiment, clients 102, 104 are referred to as database clients.

In at least one embodiment of the depicted system 100, interaction between a client 102, 104 and the distributed database system 100 is performed using an interaction protocol that defines a format for exchanging messages between a client 102, 104 and the distributed database system 100. A client 102, 104 may comprise a driver module, or other software, that implements an interaction protocol. Clients 102, 104 may communicate with the distributed database system 100 via a network 112, e.g. by transmitting messages via an interaction protocol to a front-end system, such as to a node or other element of a query processing subsystem 106.

In the example of FIG. 1, query processing subsystem 106 comprises a plurality of front-end nodes, which may also be described as front-end peers, query processing peers, or as peers. In at least one embodiment of the depicted system 100, front-end nodes are added to or removed from the front-end 106 to scale according to demands on capacity or utilization.

In at least one embodiment of the depicted system 100, query processing subsystem 106 provides table-oriented access to data maintained by the distributed database system 100. Table-oriented, or tabular, access refers, in part, to the data being accessed in terms of tables, e.g., as rows and columns of table.

In at least one embodiment of the depicted system 100, query processing subsystem 106 provides access to data specified in terms of a table-oriented query language, such as structured query language ("SQL") or Cassandra query language ("CQL"). In at least one embodiment of the depicted system 100, access to data is table-oriented but non-relational. As such, a query language supported by the query processing subsystem 106 may be a subset of a relational query language, such as SQL.

In at least one embodiment of the depicted system 100, query processing subsystem 106 comprises a query parser and query planner. When a query is received from a client 102, 104, the query parser analyzes the query, identifies the query's constituent keywords and clauses, and determines the query's meaning. The query planner then formulates a plan for executing the query. In at least one embodiment of the depicted system 100, the query processing subsystem 106 then executes the query plan.

In at least one embodiment of the depicted system 100, each node of the query processing subsystem 106 is independently capable of performing the aforementioned functions of the query parser and query planner, and of executing the generated query plan. In at least one embodiment of the depicted system 100, execution of a generated query plan comprises interaction with one or more storage nodes of a storage subsystem 108.

In the example of FIG. 1, storage subsystem 108 comprises a plurality of storage nodes, which may also be describe as storage peers, or as peers. The term peer may also be used to refer to a combination of one or more query processing peers and one or more storage peers.

In at least one embodiment of the depicted system 100, storage nodes are added to or removed from the storage subsystem 108 to scale according to demands on capacity or utilization.

In at least one embodiment of the depicted system 100, the storage subsystem 108 operates as a key-value, non-relational data store. The storage subsystem 108, in at least one embodiment of the depicted distributed database system 100, is a key-value or key-to-values data store having comparatively high scaling properties, but comparatively limited query capabilities. For example, while embodiments of the query processing subsystem 106 may provide support for SQL or CQL queries, embodiments of the storage subsystem may instead support comparatively primitive operations which store and retrieve individual values, or collections of values, based on a key value. The storage subsystem 108 may, in some embodiments, provide limited support for range queries, e.g. by providing for the retrieval of values, or collections of values, associated with a range of key values. In at least one embodiment of the depicted distributed database system 100, these limitations allow the system 100 to be highly scalable, and to facilitate implementation of a range of replication models and approaches to multi-tenancy.

In at least one embodiment of the depicted system 100, a control plane 110 facilitates scaling the capacity of the query processing subsystem 106. The control plane 110 may, for example, monitor actual or forecast capacity utilization of the query processing subsystem 106 and add or remove query processing nodes accordingly.

In at least one embodiment of the depicted system 100, the control plane 110 facilitates scaling the capacity of the storage subsystem 108. The control plane 110 may, for example, monitor actual or forecast capacity utilization of the storage subsystem 108 and add or remove storage nodes to the storage subsystem 108.

In at least one embodiment of the depicted system 100, the control plane 110 facilitates management of capacity utilization by respective clients 102, 104. For example, the control plane 110 may monitor capacity utilization by clients 102, 104 and determine allocations of partitions among storage nodes of the storage subsystem 108. Similarly, the control plane 110 may determine how many and which query processing nodes the clients 102, 104 should have access to.

In at least one embodiment of the depicted system 100, the query processing subsystem 106 includes an error handler, not shown for clarity. An example error handler 210 is described with respect to FIG. 2. When storage subsystem 108 generates an exception in response to a request from a client, the error handler may determine whether the exception corresponds to a request that can be retried. If the exception corresponds to a request that can be retried, the error handler may resend the request on behalf of the client 102, 104 that initially sent the request. The error handler may send a response to the client 102, 104 based on the resent request. The response may be a message that indicates successful completion of the initial request if the resent request completes successfully. If the resent request does not complete successfully, the response may be an error message. In at least one embodiment, exceptions generated by the storage subsystem 108 are in a first format, and the error handler generates error messages in a second format by mapping the exception to a format expected by the client 102, 104.

In at least one embodiment of the depicted system 100, the control plane 110 facilitates some types of requests from clients 102, 104 such as requests to create or delete a table in the storage subsystem 108. For types of requests facilitated by the control plane 110 that can be retried, the error handler retries one or more control plane operations when resending the request in response to a generated exception.

Figure 2:
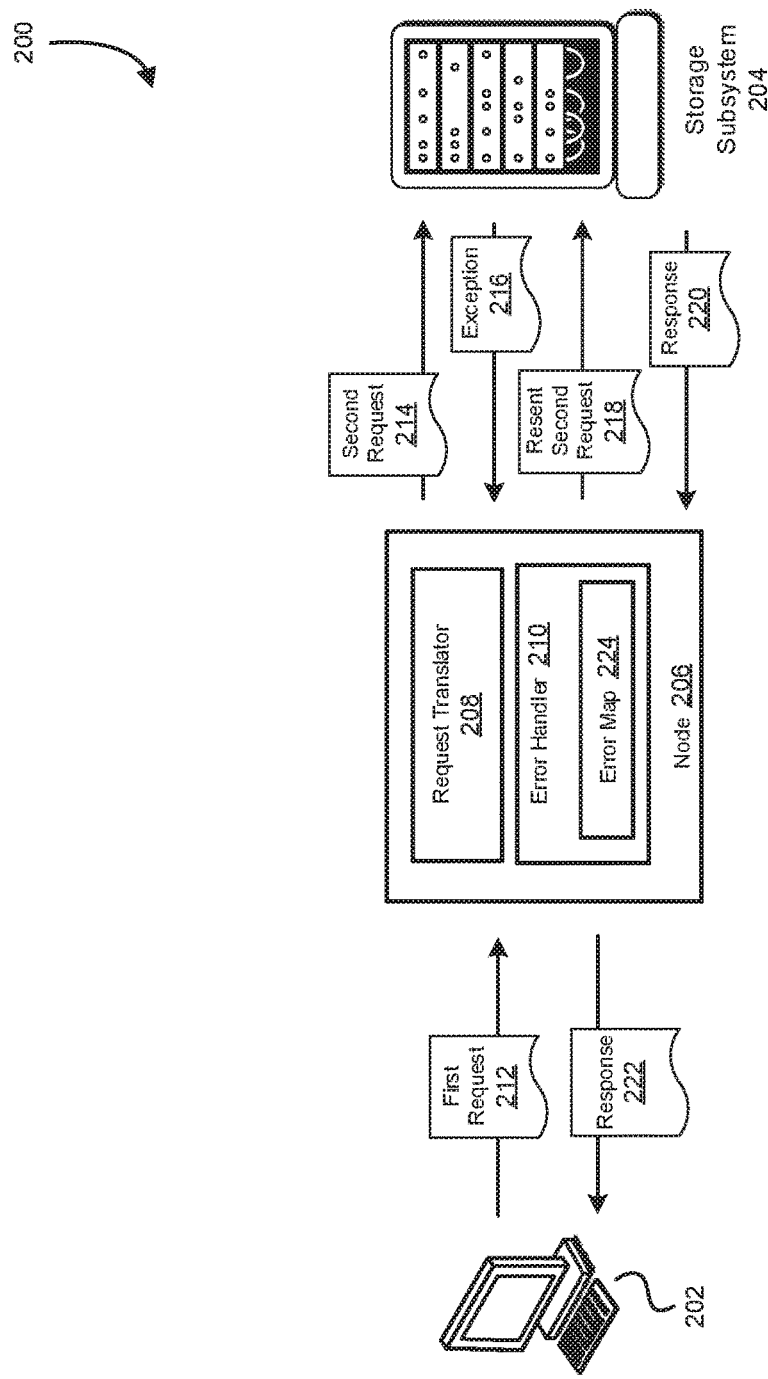
FIG. 2 illustrates an example of exception handling, in accordance with at least one embodiment.

FIG. 2 illustrates an example 200 of exception handling, in accordance with at least one embodiment. In the example 200 of FIG. 2, a database client 202 interacts with a storage subsystem 204 of a distributed database through a node 206 that may include a request translator 208 and an error handler 210. In at least one embodiment, the database client 202 corresponds to client 102 or client 104. In at least one embodiment, the storage subsystem 204 corresponds to storage subsystem 108. In at least one embodiment, node 206 is a headend subsystem that is a part of query processing subsystem 106. Although one database client 202 is shown for clarity, it should be understood that node 206 can serve multiple database clients.

In at least one embodiment, the database client 202 operates with a first mode of operation that includes a first request syntax and a first error format, and the storage subsystem 204 operates with a second mode of operation, different than the first mode of operation, that includes a second request syntax and a second error format. The node 206 may translate between the first mode of operation and the second mode of operation to allow the database client 202 to issue requests and receive error messages using the first mode of operation in relation to a database that operates using the second mode of operation. In at least one embodiment, one or more components of the node 206, such as the request translator 208 and the error handler 210, are referred to as a headend.

In at least one embodiment, the database client 202 sends a first database request 212 that is translated by the request translator 208 to generate a second database request 214 that is sent to the storage subsystem 204. The first database request 212 may be a data manipulation request, such as a SELECT, INSERT, or UPDATE command, a data definition request, such as a CREATE TABLE command, or some other type of database request. The request translator 208 translates the first database request 212 by generating the second database request 214, using the second request syntax, for sending to the storage subsystem 204. In some situations, the storage subsystem 204 generates an exception 216 in response to the second database request 214. The exception 216 is communicated from the storage subsystem 204 to the node 206 with an error message using the first error format.

In at least one embodiment, the error handler 210 determines whether the error message corresponds to a type of request that can be retried. If the error handler 210 determines that the error message corresponds to a request that can be retried, the node 206 resends the second database request 214 to the storage subsystem 204. The node 206 may resend the second database request 214 as a resent second database request 218 on behalf of the database client 202, without notifying the database client 202 of the resending. The node 206 may continue to resend the second database request 214 as the resent second database request 218 until a first of an expiration of a predefined time period, or until the resent second database request 218 completes successfully. The predefined time period may be set to correspond to a typical database client request timeout period, such as a timeout period expected to be set by an operator of the database client 202. In at least one embodiment, the predefined time period may begin at a time the first database request 212 is received by the node 206. However, it should be understood that the predefined time period may also start at other times in other embodiments, such as at a time specified by a timestamp associated with generation of the first database request 212.

In at least one embodiment, if the database client 202 sends the same first database request 212 to the node 206 before the predefined time period has expired, it may indicate that the timeout period of the database client 202 is shorter than the set predefined time period at the node 206. In at least one embodiment, if the node 206 receives the same first database request 212 from the database client 202 before the predefined time period has expired, the node 206 reduces the predefined time period used. The node 206 may periodically reset the predefined time period to a default value to account for a possibility of varying timeout periods used by the database client 202 for different applications.

In at least one embodiment, the storage subsystem 204 may send a message 220 in response to the resent second database request 218. If the resent second database request 218 is successful, the message 220 may include an indication of successful completion of the request. If the resent second database request 218 is unsuccessful, the message 220 may be an error message that includes an exception generated by the storage subsystem 204.

In at least one embodiment, the error handler 210 may send a response 222 to the database client 202. The response 222 may be a message that includes an indication of successful completion of a request if the resent second database request 218 successfully completes. The response 222 may be an error message if the resent second database request 218 does not successfully complete before the expiration of the predetermined time period.

In at least one embodiment, the response 220 includes a first error message having a first format. The error handler 210 generates a second error message based, at least in part on the first error message. For example, the error handler 210 may generate the second error message by mapping the first error message to a second format using an error map 224. In at least one embodiment where the response 220 includes an indication of successful completion of a request, the error handler 210 translates the indication of successful completion to a format expected by the database client 202 that is sent as the response 222. The error map 224 may also include a mapping to translate an indication of successful completion from the format generated by the storage subsystem 204 to a format expected by the database client 202.

In at least one embodiment, if the exception 216 does not correspond to a type of request that can be retried, the error handler 210 may translate the exception 216 to an error format expected by the database client 202, and send the translated exception as the response 222. In at least one embodiment, from a perspective of the database client 202, the response 222 is received in response to the first database request 212 even though it is created by the error handler 210 in response to an indication of successful completion or in response to an exception, received from the storage subsystem 204 in response to the second database request 214 or the resent second database request 218.

In at least one embodiment, the error map 224 includes mapping information to map exceptions generated by the storage subsystem 204 in a first format, to error messages in a second format that can be acted upon by the database client 202. The error map 224 may also include other information that can be used by the error handler 210 to appropriately handle exceptions from the storage subsystem 204. For example, the error map 224 may include an indication of whether the exception corresponds to a request that can be retried, an indication of whether the exception includes an error message that needs to be parsed to determine appropriate action, an indication of whether additional checks need to be performed, and/or an indication of whether a control plane operation needs to be retried. Although the error map 224 is described as being a map, it should be understood that some or all of the relationships indicated in the error map 224 may be maintained in any suitable type of data structure, and/or may be implemented as computer-readable executable instructions.

FIG. 3 illustrates an example of an error map 300, in accordance with at least one embodiment. In at least one embodiment, the error map 300 corresponds to the error map 224. It will be appreciated that the depicted example of error map 300 is intended to be illustrative rather than limiting, and as such FIG. 3 should not be construed in a manner which would limit the present disclosure to only those embodiments that include the specific example provided. It should be understood that the specific codes, names, and indicators presented in the error map 300 are for purposes of illustration only and should not be construed in a manner which would limit the present disclosure to only those embodiments that include the specific codes, names, and/or indicators shown and described with respect to FIG. 3.

In at least one embodiment, error map 300 is maintained by a portion of a distributed database management system, such as node 206, as one or more tables. However, it should be understood that some or all of the relationships indicated in error map 300 may be maintained in some other type of data structure, and/or may be implemented as a portion of computer-readable executable instructions for directing operation of the error handler 210.

In at least one embodiment, the error map 300 includes a first set of fields 302 that include information in a first format that corresponds to exceptions generated by the storage subsystem 204. The error map 300 may also include a second set of fields 304 that include information in a second format that corresponds to a format of error messages expected by one or more database clients such as database client 202. The error map 300 may also include a third set of fields 306 that include one or more indicators for use by the error handler 210. The first set of fields 302 is shown to include a Status Code field and an Exception Name field, but it should be understood that this is for purposes of illustration only, and the first set of fields may include different fields, fewer fields, and/or additional fields. The second set of fields 304 is shown to include an Error Code field and an Error Name field, but it should be understood that this is for purposes of illustration only, and the second set of fields may include different fields, fewer fields, and/or additional fields. In at least one embodiment, the first set off fields 302 includes an Error Message field, not shown for clarity. In at least one embodiment, the second set of fields 304 includes an Error Message field, not shown for clarity. The third set of fields 306 is shown to include a Retry, a Parse, and an Additional Check field, but it should be understood that this is for purposes of illustration only, and the third set of fields 306 may include different fields, fewer fields, and/or additional fields. In at least one embodiment, the third set of fields 306 includes metadata used by the error handler 210 to determine an appropriate error translation and/or an appropriate error handling operation.

In at least one embodiment, error map 300 comprises a database exception identifier and a corresponding database client error identifier. In at least one embodiment, error map 300 includes one or more additional fields, such as a retry indicator, a parse indicator, and/or a perform additional check indicator. The error map 300 may also include a field, not shown for clarity, that indicates a type of client driver associated with the exception to error mapping. Use of a client type indicator may allow the error handler 210 to map exceptions generated by the storage subsystem 204 to more than one type of client driver, each of which could expect errors to be received in different formats. In at least one embodiment, the error map 300 may also include one or more error message fields, not shown for clarity.

In at least one embodiment, the retry indicator may indicate whether the exception corresponds to a request that can be retried. The parse indicator may indicate whether an error message associated with the exception should be parsed to determine further action. For example, when a single exception type in the first format maps to multiple error types in the second format, an error message associated with the exception may be parsed to determine which of the multiple error types the exception should be mapped to.

In at least one embodiment, the perform additional check indicator may indicate that one or more additional checks should be performed before acting on the generated exception. For example, when an exception is generated in response to a request to access a table that is not available, additional checks may be performed to determine whether the table is in the process of being created. In at least one embodiment, such a scenario may occur when a client driver sends a table creation request, quickly followed by a request to write to the table without waiting for confirmation that the table has been created. It will be appreciated that these examples are intended to be illustrative rather than limiting, and as such FIG. 3 should not be construed in a manner which would limit the present disclosure to only those embodiments that include the specific examples provided.

In at least one embodiment, error handler 210 performs one or more operations based, at least in part, on one or more relationships indicated by the error map 300. For example, exception 216 may include a status code and an exception name. The error handler 210 may determine that the exception corresponds to a request that can be retried using the error map 300. After resending the request, the response 220 received by the error handler 210 may also include a status code and an exception name. For example, the exception name may be ProvisionedThroughputExceeded. The error handler 210 may translate this exception to one of a Read Timeout error or a Write Timeout error, based on whether the request that resulted in the ProvisionedThroughputExceeded error was a read or a write request. If the request was a read request and the resent requests were unsuccessful, the error handler 210 may send an error code of 0x1200 and a Read Timeout error name as part of response 222, based on the mapping in the error map 300. This example illustrates a one to many relationship that the error handler 210 may resolve based on a type of request that resulted in the exception.

In at least one embodiment, the error handler 210 may also resolve one to many relationships in the error map 300 in a different manner. For example, the error handler 210 may parse an error message to determine an appropriate mapping. This approach may be followed in a case such as when exception 216 indicates an exception name of ValidationException. The error handler 210 may parse an error message, not shown for clarity, received with the exception 216 to determine whether the exception should be translated to an Already Exist error, an Invalid Error, or a Syntax_Error. After parsing the error message to determine the appropriate error, the error handler may send the determined error code and error name as part of response 222 without retrying the request, based on indication in the error map that the exception does not correspond to a type of request that can be retried.

In at least one embodiment, some types of exceptions may be a one-to-one mapping and/or may not require additional activity by the error handler 210 other than an appropriate translation and sending to the database client. For example, when exception 216 indicates an exception name of AccessDeniedException, the error handler 210 may send and error code of 0x2100 and an error name of Unauthorized as part of response 222 without taking further action.

In at least one embodiment, some types of exceptions generated by the storage subsystem in the first format may not have a corresponding error in the second format. For example, when exception 216 indicates an exception name of LimitExceededException, the error handler 210 may retry a request that led to the LimitExceededException without translating the exception to an error message format expected by the database client 202. This exception may be issued when a number of concurrent control plane operations exceeds a predetermined limit, and the error handler 210 may resolve the exception by retrying control plane operations such as CREATING, UPDATING, or DELETING tables in a manner that does not exceed the limit. In at least one embodiment, other types of exceptions, such as those that are transient in nature, may also be addressed by the error handler without translating the exception to an error message to a format expected by the database client.

In at least one embodiment, the error map 300 may include a mapping for one or more of the following exceptions generated by the storage subsystem 204, and one or more corresponding errors for a database client. It should be understood that these exceptions are presented for purposes of illustration only, and the error map 300 may include mappings for different, fewer, or additional exceptions. The error map 300 may include an access denied exception, which indicates a client did not correctly sign a request. The error map 300 may include a conditional check failed exception, which indicates that a conditional request failed, such as where a specified condition evaluated to false. The error map 300 may include an incomplete signature exception, which indicates that a request signature did not include all components required by the storage subsystem 204. The error map 300 may include a missing authentication token exception, which indicates that a request did not include a required authorization header, or was otherwise malformed. The error map 300 may include an unrecognized client exception, which indicates that a request signature is invalid, such as may occur when an access key identifier or a security token is invalid. The error map 300 may include a limit exceeded exception, which indicates that the number of concurrent control plane operations exceeds a limit established for a given subscriber. The error map 300 may include a provisioned throughput exceeded exception, which indicates that a provisioned throughput for a database has been exceeded. The provisioned throughput exceeded exception may indicate that a maximum allowed provisioned throughput for a table or for one or more global secondary indexes has been exceeded. The error map 300 may include a request limit exceeded exception, which indicates that a throughput exceeds a current limit for an account, such as when a rate of on-demand requests exceeds an allowed account throughput. The error map 300 may include a resource in use exception, which indicates that the resource which the client is attempting to change is in use, such as when a request tries to re-create an existing table or attempts to delete a table currently in the CREATING state. The error map 300 may include a resource not found exception, which indicates that the requested resource was not found, such as when the table being requested does not exist. The error map 300 may include a throttling exception, which indicates that a rate of requests exceeds an allowed throughput, such as when CreateTable, UpdateTable, and/or DeleteTable requests are performed too rapidly. In at least one embodiment, the error handler 210 may handle throttling exceptions by retrying one or more control plane operations without notifying the database client 202. The error map 300 may include a validation exception, which may indicate that a required parameter from the request is missing, a value in the request is out of range, or the request includes a mismatched datatype. In at least one embodiment, an error message associated with the validation exception includes additional details about the specific part of the request that caused the error. The error handler 210 may parse the error message associated with the validation exception to determine an appropriate translation of the validation exception. The error map 300 may include an internal server error exception, which indicates that the storage subsystem 204 could not process the request. The error map 300 may include a service unavailable exception, which indicates that the storage subsystem 204 is currently unavailable.

Figure 4:
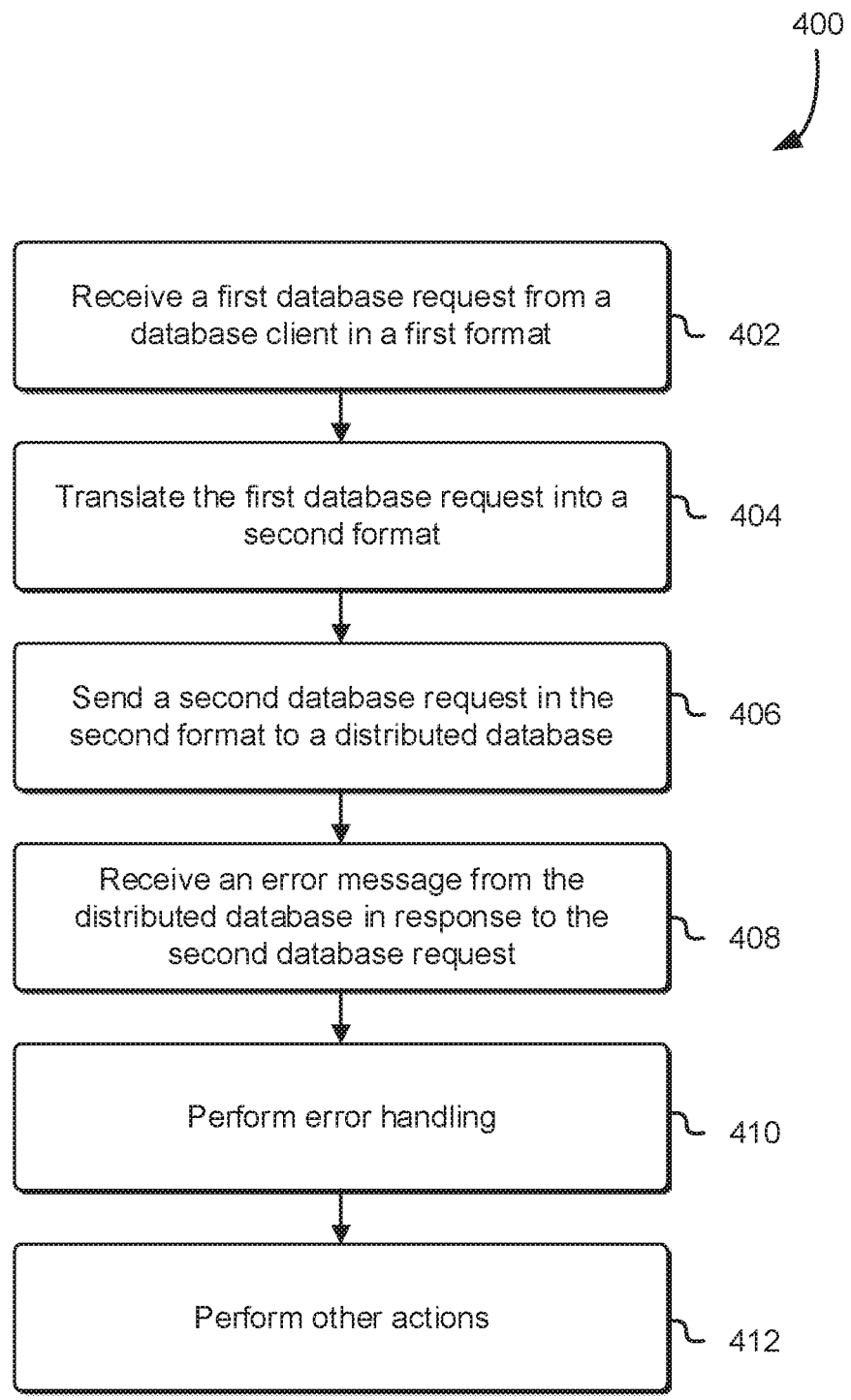
FIG. 4 illustrates an example process of translating a database request and performing error handling, in accordance with at least one embodiment.

FIG. 4 illustrates an example process 400 of performing error handling, in accordance with at least one embodiment. The example process 400 may be performed by any suitable computing system or combination of systems, including for example the servers depicted in FIG. 7.

Although FIG. 4 is depicted as a series of steps or operations, the depicted sequence should not be viewed as limiting the scope of the present disclosure to only those embodiments that conform to the depicted sequence. For example, in various embodiments, the steps or operations depicted in FIG. 4 may be altered, reordered, or omitted, except where explicitly stated or where logically required, such as when an input to one step or operation is obtained from an output of another step or operation.

At 402, a distributed database management system receives a first database request from a database client in a first format. In at least one embodiment, a headend system, such as may be maintained on node 206, receives the first database request. For example, the first database request may be received as first database request 212 shown in FIG. 2.

At 404, a request translator, such as the request translator 208, translates the first request from the first format to generate a second database request in a second format.

At 406, the headend system sends the second database request to a storage subsystem, such as the storage subsystem 108 or the storage subsystem 204, of a distributed database. For example, node 206 may send the second database request as the second database request 214 shown in FIG. 2.

At 408, an error handler, such as the error handler 210, receives an error message from the storage subsystem in response to the second database request. For example, the error handler 210 may receive the error message as the exception 216 from the storage subsystem 204, as shown and described with respect to FIG. 2.

At 410, the error handler performs error handling. In at least one embodiment, performing error handling at 410 may include one or more actions discussed in relation to error handler 210 of FIG. 2 and/or error map 300 of FIG. 3. In at least one embodiment, performing error handling at 410 includes one or more operations discussed with respect to process 500 of FIG. 5 or process 600 of FIG. 6. For example, performing error handling may include resending a request. In at least one embodiment, performing error handling may involve other remediation actions. For example, other remediation actions may include increasing database provisioning, such as increasing provisioned throughput for at least one table or index via control plane 110. In at least one embodiment, the other remediation actions may include enabling on-demand scaling, or increasing at least one limit based on one or more database use metrics or heuristics. For example, the error handler may increase a request limit in response to a request limit exceeded exception, or increase a provisioned throughput in response to a provisioned throughput exceeded exception. In at least one embodiment, the error handler may remove one or more limits for the database client via the control plane 110, and/or may remove one or more reservation slots in a subscriber record such that a limit will no longer exist to exceed.

At 412, the headend system may perform other actions. For example, the headend system may process requests from other database clients, and/or handle errors in response to requests from other database clients.

Figure 5:
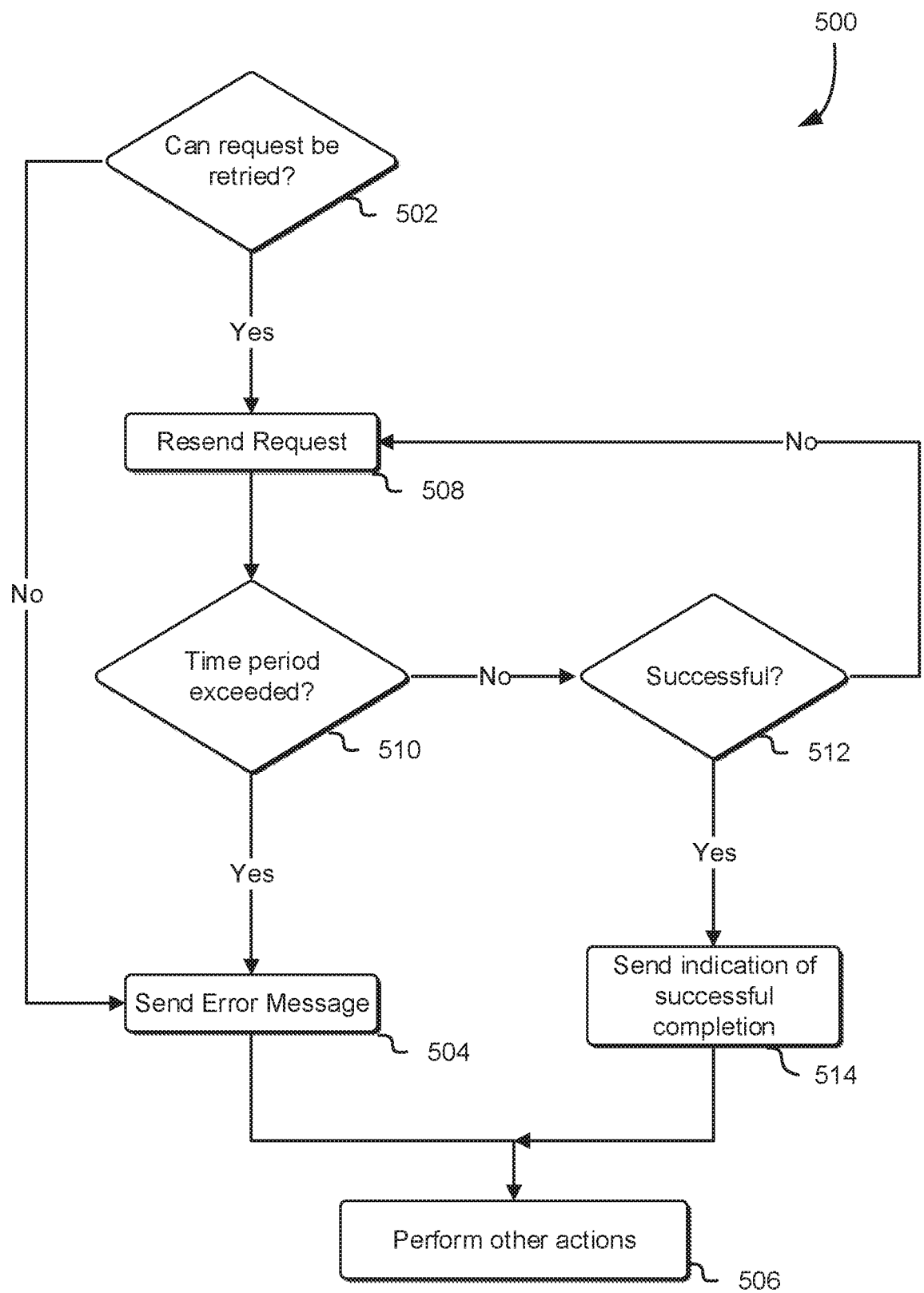
FIG. 5 illustrates an example process of performing error handling, in accordance with at least one embodiment.

FIG. 5 illustrates an example process of performing error handling, in accordance with at least one embodiment. The example process 500 may be performed by any suitable computing system or combination of systems, including for example the servers depicted in FIG. 7. In at least one embodiment, at least one operation performed by the process 500 may correspond to operations performed at 410 of the process 400.

Although FIG. 5 is depicted as a series of steps or operations, the depicted sequence should not be viewed as limiting the scope of the present disclosure to only those embodiments that conform to the depicted sequence. For example, in various embodiments, the steps or operations depicted in FIG. 5 may be altered, reordered, or omitted, except where explicitly stated or where logically required, such as when an input to one step or operation is obtained from an output of another step or operation.

At 502, an error handler, such as the error handler 210, determines whether a received exception corresponds to a type of request that can be retried. For example, error handler 210 may determine whether second database request 214 corresponds to a type of request that can be retried base on exception 216 received from storage subsystem 204. In an example embodiment, error handler 210 may make the determination based on whether a retry indicator in error map 300 associated with the received exception 216 indicates that the request can be retried.

At 504, if the error handler determines at 502 that the exception does not correspond to a type of request that can be retried, the error handler sends an error message to the database client that sent the initial request resulting in the exception. For example, error handler 210 may generate an error message by translating the exception to another format using the error map 300, and send it as the response 222. In at least one embodiment, the process 500 may include determining whether an error message should be sent at 504, and sending or not sending the error message based on the determination. For example, error handler 210 may make a determination to not send an error message if the fields for the second error format in error map 300 that correspond to the exception are empty or contain NULL entries.

At 506, the error handler may perform other actions, such as handling errors from one or more other database clients. In an example embodiment, performing other actions at 506 corresponds to performing other actions at 412.

At 508, if the error handler determines at 502 that the exception corresponds to a type of request that can be retried, the error handler resends the request that resulted in the exception. For example, error handler 210 may resend second database request 214.

At 510, the error handler determines whether a predetermined time period has been exceeded. In at least one embodiment, the predetermined time period is initially set to an expected timeout period of a database client. In at least one embodiment, a time elapsed is measured from a time an initial request is received from a database client, such as a time the first database request 212 is received at node 206. The time elapsed may be measured in a different manner in other embodiments, such as from a time indicated by a timestamp associated with when a first request was generated. In at least one embodiment, the error handler waits for a response from the storage subsystem before determining whether the time period has been exceeded at 510. For example, error handler 210 may wait for a predetermined waiting period for the response 220 after resending the request at 508 before determining whether the time period is exceeded at 510.

At 512, if the error handler made a determination that the time period has not been exceeded at 510, the error handler determines whether the resent request was completed successfully. For example, the response 220 may indicate to the error handler 210 that the resent second request 218 was completed successfully.

At 514, if the error handler made a determination that the resent request was completed successfully at 512, the error handler sends an indication of successful completion to the database client. For example, error handler 210 may send the response 222 to the database client 202 with an indication of successful completion.

In at least one embodiment, if the error handler made a determination that the resent request was not completed successfully at 512, the process 500 returns to 508 where the error handler continues to resend the request to the storage subsystem. In at least one embodiment, the error handler may resend the request at 508 with a timing determined by an exponential backoff algorithm.

Figure 6:
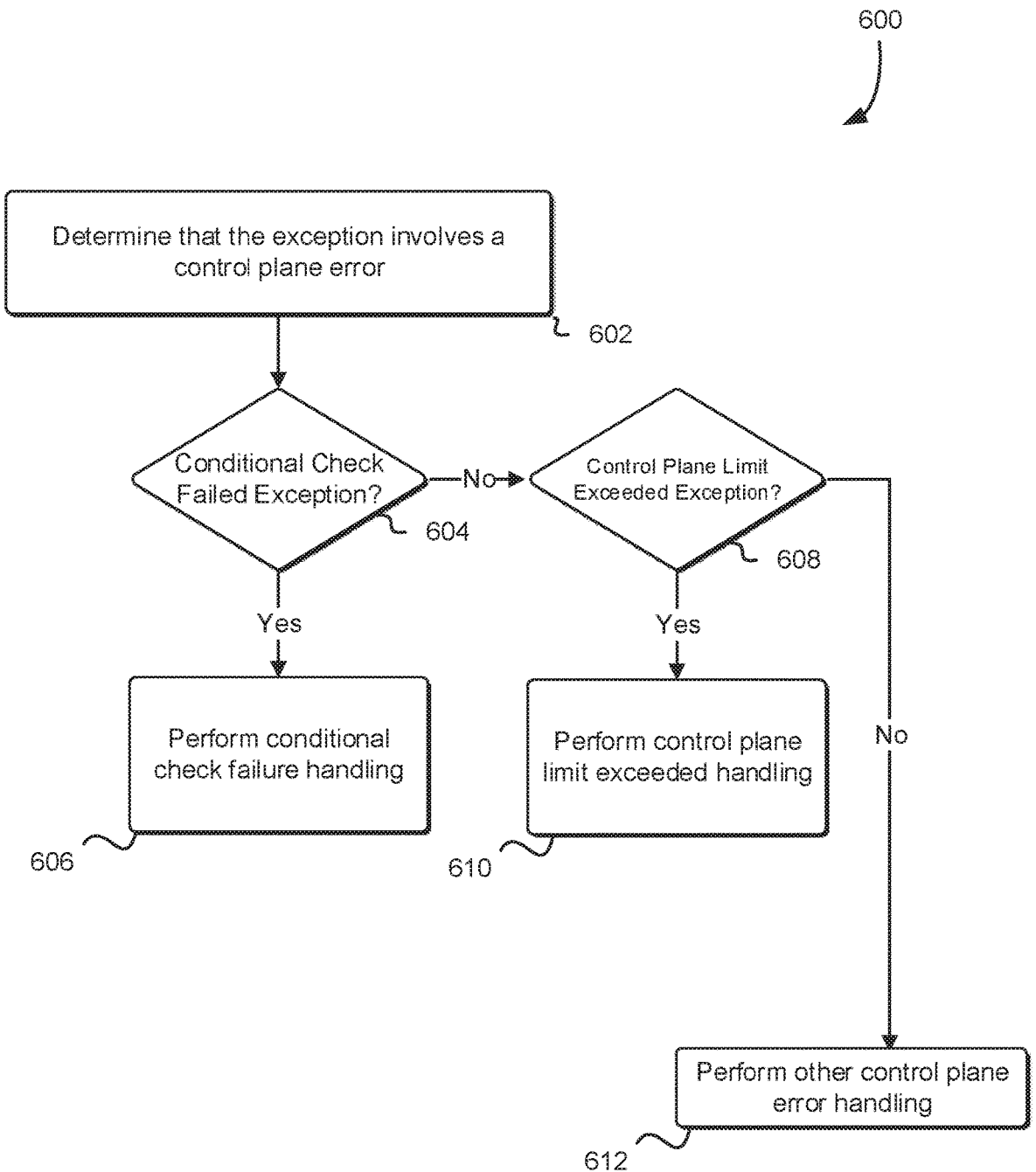
FIG. 6 illustrates an example process of performing control plane error handling, in accordance with at least one embodiment.

FIG. 6 illustrates an example process 600 of performing control plane error handling, in accordance with at least one embodiment. The example process 600 may be performed by any suitable computing system or combination of systems, including for example the servers depicted in FIG. 7. In at least one embodiment, at least one operation of the process 600 may be included as part of process 500 and/or performing error handling at 410.

Although FIG. 6 is depicted as a series of steps or operations, the depicted sequence should not be viewed as limiting the scope of the present disclosure to only those embodiments that conform to the depicted sequence. For example, in various embodiments, the steps or operations depicted in FIG. 6 may be altered, reordered, or omitted, except where explicitly stated or where logically required, such as when an input to one step or operation is obtained from an output of another step or operation.

At 602, an error handler, such as error handler 210, determines that an exception, such as exception 216, involves a control plane error. In at least one embodiment, exception map 224 includes a control plane indicator field that indicates whether a particular exception involves a control plane error, and the error handler makes the determination based, at least in part, on the control plane error indicator.

At 604, the error handler determines whether the exception involves a failure of a conditional check. For example, error handler 210 may determine that the exception 216 involves a conditional check failed exception using an exception name, an exception code, and/or an error message sent by the storage subsystem 204 with the exception 216.

At 606, if the error handler determined that the exception involves a failure of a conditional check at 604, the error handler performs conditional check failure handling. In an at least one embodiment, the error handler resends a request in the event of an UPDATE failure. For example, the error handler may retry one or more control plane operations by resending the request to the storage subsystem 108 via the control plane 110. Retrying one or more control plane operations at 606 may include causing a control plane, such as control plane 110, to reattempt one or more control plane operations. In at least one embodiment, the error handler translates the exception to a more verbose error such as Already exists in the case of a CREATE failure, or Invalid in the case of a DELETE failure.

At 608, if the error handler determined that the exception does not involve a failure of a conditional check at 604, the error handler determines whether the exception involves a control plane limit exceeded exception. For example, error handler 210 may determine that exception 216 involves a control plane limit exceeded exception using an exception name, an exception code, and/or an error message sent by the storage subsystem 204 with the exception 216. Although the determinations at 604 and 608 are shown separately, it should be understood that the error handler may determine whether the exception involves a conditional check failed exception or a control plane limit exceeded exception in a single operation, in at least one embodiment.

At 610, if the error handler determined that the exception involves a control plane limit exceeded exception at 608, the error handler performs control plane limit exceeded handling. In at least one embodiment, the error handler retries control plane actions in a manner such that they do not go above the limit. For example, error handler 210 may resend the requests to the storage subsystem 108 via the control plane 110, timed in a manner such that they do not exceed the control plane limit. Resending requests at 610 may include causing a control plane, such as control plane 110, to reattempt one or more control plane operations.

At 612, if the error handler determined that the exception does not involve a control plane limit exceeded exception at 608, the error handler performs other control plane error handling. For example, error handler 210 may retry one or more control plane operations associated with the request that resulted in the exception. In at least one embodiment, error handler 210 retries one or more control plane operations via the control plane 110. In at least one embodiment, for a resource not found exception that involves the control plane, the error handler waits for a table to be created before accessing it. Retrying one or more control plane operations at 612 may include causing a control plane, such as control plane 110, to reattempt one or more control plane operations.

In an example embodiment, a system, comprises at least one processor and a memory that stores executable instructions that, in response to execution by the at least one processor, cause the system to at least receive a first database request from a database client.

In this example embodiment, the instructions, in response to execution by the at least one processor, cause the system to generate a second database request based, at least in part, on translating the first database request from a first syntax to a second syntax, different than the first syntax.

In this example embodiment, the instructions, in response to execution by the at least one processor, cause the system to send the second database request to a storage subsystem of a distributed database.

In this example embodiment, the instructions, in response to execution by the at least one processor, cause the system to receive an error message generated by the storage subsystem in response to the second database request.

In this example embodiment, the instructions, in response to execution by the at least one processor, cause the system to determine whether the error message corresponds to a request that can be retried.

In this example embodiment, the instructions, in response to execution by the at least one processor, cause the system to resend the second database request in response to the determination that the error message corresponds to a request that can be retried.

In this example embodiment, the instructions, in response to execution by the at least one processor, cause the system to send a response to the database client based, at least in part, on the resent second database request.

In a further embodiment of this example, the system receives an additional error message in response to the resent second database request and continues to resend the second database request until a first of an expiration of a predetermined time period or until the second database request completes successfully.

In a further embodiment of this example, the error message indicates that a provisioned throughput for the database has been exceeded.

In a further embodiment of this example, resending the second database request causes a control plane to reattempt an operation.

In a further embodiment of this example, the error message is a first error message, and the executable instructions, in response to execution by the at least one processor, cause the system to at least receive, in a first format, a second error message in response to the resent second database request and generate the response to the database client based, at least in part, on mapping the second error message to a second format.

In an example embodiment, a computer-implemented method comprises steps or operations which include receiving a first database request from a client driver, generating a second database request based, at least in part, on translating the first database request, sending the second database request to a storage subsystem of a distributed database, and receiving an error message from the storage subsystem in response to the second database request.

This example embodiment of a computer-implemented method further comprises determining whether the second database request can be retried based, at least in part, on the error message.

This example embodiment of a computer-implemented method further comprises resending the second database request to the storage subsystem on behalf of the client driver in response to determining the second database request can be retried.

This example embodiment of a computer-implemented method further comprises receiving a first response from the storage subsystem in response to the resent second database request.

This example embodiment of a computer-implemented method further comprises sending a second response to the client driver based, at least in part, on translating the first response from a first format to a second format different than the first format.

In a further embodiment of this example method, generating the second database request includes translating the first database request from a first syntax to a second syntax different than the first syntax.

In a further embodiment of this example method, resending the second database request is performed until a first of an expiration of a predetermined time period or until the resent second database request completes successfully.

In a further embodiment of this example method, resending the second database request is performed using an exponential backoff algorithm.

In a further embodiment of this example method, the error message is a first error message, the first response is a second error message, and the method further comprises generating a third error message based, at least in part, on translating the second error message from the first format to the second format and sending the third error message to the client driver as the second response.

In a further embodiment of this example method, the first response indicates successful completion of the resent second database request.

In a further embodiment of this example method, the error message indicates that a request limit for an account associated with the client driver has been exceeded.

In a further embodiment of this example method, resending the second database request causes a control plane to reattempt an operation.

In an example embodiment, a non-transitory computer-readable medium comprises instructions that, when executed by at least one processor of a computing device, cause the computing device to perform any of the embodiments of the computer-implemented method just described.

Figure 7:
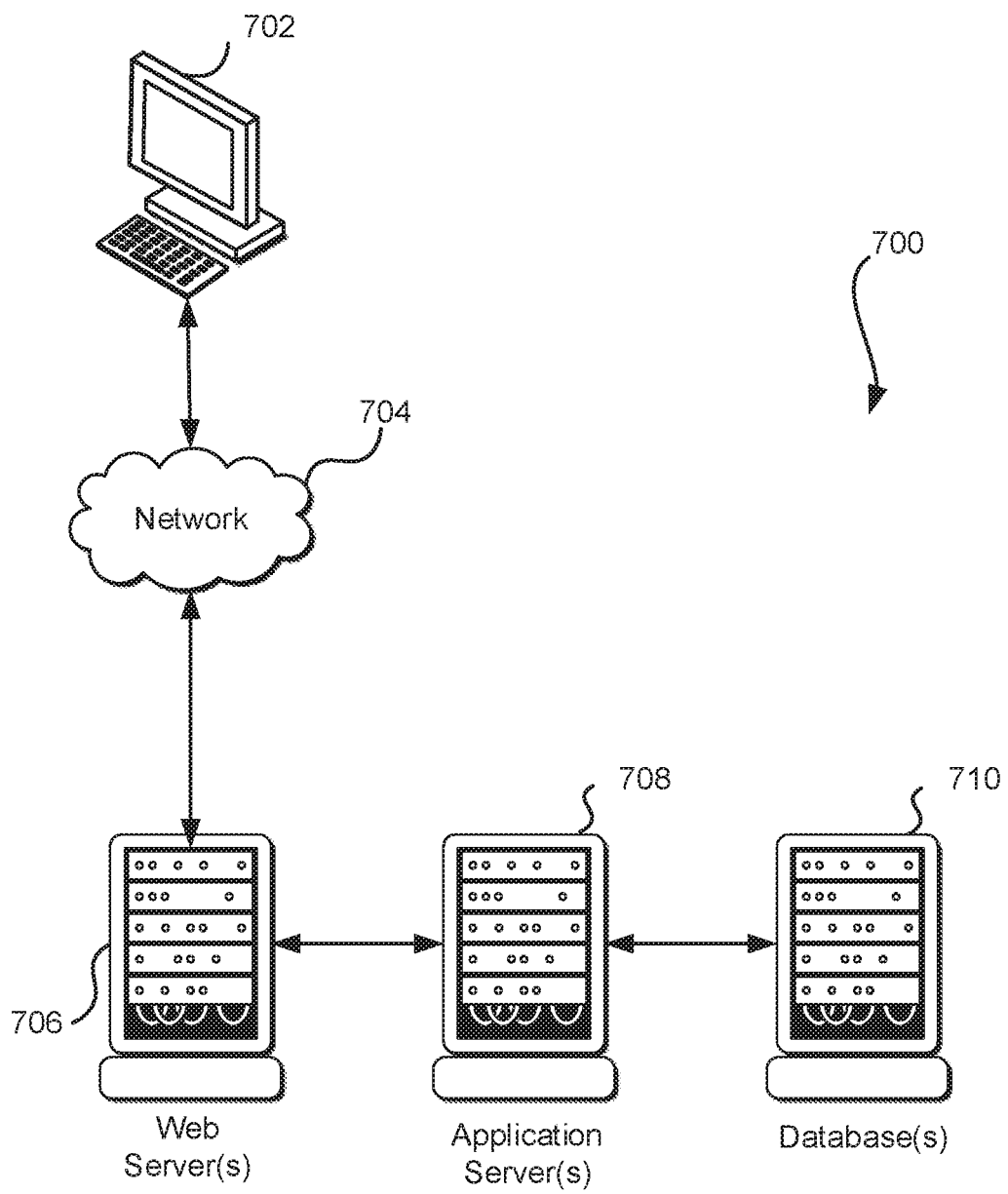
FIG. 7 illustrates an example of a system in which various embodiments can be implemented.

FIG. 7 illustrates aspects of an example system 700 for implementing aspects in accordance with an embodiment. As will be appreciated, although a web-based system is used for purposes of explanation, different systems may be used, as appropriate, to implement various embodiments. In an embodiment, the system includes an electronic client device 702, which includes any appropriate device operable to send and/or receive requests, messages, or information over an appropriate network 704 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 706 for receiving requests and serving content in response thereto, although for other networks an alternative device serving a similar purpose could be used as would be apparent to one of ordinary skill in the art.

In an embodiment, the illustrative system includes at least one application server 708 and one or more databases 710, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 702 and the application server 708, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The one or more databases 710, in an embodiment, includes several separate data tables, databases, data documents, dynamic data storage schemes and/or other data storage mechanisms and media for storing data relating to a particular aspect of the present disclosure. The one or more databases 710, in an embodiment, is operable, through logic associated therewith, to receive instructions from the application server 708 and obtain, update or otherwise process data in response thereto, and the application server 708 provides static, dynamic, or a combination of static and dynamic data in response to the received instructions. The one or more databases 710 correspond, in various embodiments, to a distributed database system, such as the system depicted by FIG. 1.

In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 702. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 700 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 700, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization, and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the subject matter set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the subject matter recited by the claims to the specific form or forms disclosed but, on the contrary, the intention is to cover all modifications, alternative constructions, and equivalents falling within the spirit and scope of this disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate various embodiments and does not pose a limitation on the scope of the claims unless otherwise claimed. No language in the specification should be construed as indicating any non-claimed element as essential to the practice of inventive subject material disclosed herein.

Embodiments of this disclosure are described herein, including the best mode known to the inventors for carrying out inventive concepts described herein. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:
    at least one processor; and
    a memory comprising executable instructions that, in response to execution by the at least one processor, cause the system to at least:
        receive a first database request in a first syntax from a database client;
        generate a second database request based, at least in part, on translating the first database request from the first syntax to a second syntax different than the first syntax;
        send the second database request to a storage subsystem of a distributed database; and
        in response to receiving an error message generated by the storage subsystem in response to the second database request:
            determine whether the error message corresponds to a request that can be retried;
            resend the second database request in response to a determination that the error message corresponds to the request that can be retried;
            translate the error message into a format expected by the database client in response to a determination that the error message does not correspond to the request that can be retried; and
            send a response, in the format expected by the database client, to the database client based, at least in part, on the resent second database request or the translated error message.

2. The system of claim 1, wherein the executable instructions, in response to execution by the at least one processor, cause the system to at least:
    receive an additional error message in response to the resent second database request; and
    continue to resend the second database request until a first of an expiration of a predetermined time period or a successful completion of the second database request.

3. The system of claim 1, wherein the error message indicates that a provisioned throughput for the distributed database has been exceeded.

4. The system of claim 1, wherein resending the second database request causes a control plane to reattempt an operation.

5. The system of claim 1, wherein the error message is a first error message, and the executable instructions, in response to execution by the at least one processor, cause the system to at least:
    receive, in a first format, a second error message in response to the resent second database request; and
    generate the response to the database client based, at least in part, on mapping the second error message to a second format.

6. The system of claim 1, wherein the database client is remote from the system.

7. The system of claim 1, wherein:
    the format expected by the database client is a first format;
    the error message is generated by the storage subsystem in a second format, the second format different from the first format;
    the database client operates with a first mode of operation that includes the first syntax and the first format; and
    the storage subsystem operates with a second mode of operation that includes the second syntax and the second format.

8. A computer-implemented method, comprising:
    receiving a first database request from a client driver;
    generating a second database request based, at least in part, on translating the first database request;
    sending the second database request to a storage subsystem of a distributed database; and
    in response to receiving an error message from the storage subsystem in response to the second database request:
        determining whether the second database request can be retried based, at least in part, on the error message;
        resending the second database request to the storage subsystem on behalf of the client driver in response to determining that the second database request can be retried;
        receiving a first response in a first format from the storage subsystem in response to the resent second database request;
        translating the error message into a second format expected by an account associated with the client driver, the second format different than the first format, in response to determining that the second database request cannot be retried; and
        sending a second response, in the second format, to the client driver based, at least in part, on the translated error message or translating the first response from the first format to the second format.

9. The method of claim 8, wherein generating the second database request includes translating the first database request from a first syntax to a second syntax different than the first syntax.

10. The method of claim 8, wherein resending the second database request is performed until a first of an expiration of a predetermined time period or a successful completion of the resent second database request.

11. The method of claim 8, wherein resending the second database request is performed using an exponential backoff algorithm.

12. The method of claim 8, wherein the error message is a first error message, the first response is a second error message, and the method further comprises:
    generating a third error message based, at least in part, on translating the second error message from the first format to the second format; and
    sending the third error message to the client driver as the second response.

13. The method of claim 8, wherein the first response indicates a successful completion of the resent second database request.

14. The method of claim 8, wherein the error message indicates that a request limit for the account associated with the client driver has been exceeded.

15. The method of claim 8, wherein resending the second database request causes a control plane to reattempt an operation.

16. A non-transitory computer-readable storage medium having stored thereon executable instructions that, in response to being executed by one or more processors of a computing device, cause the computing device to at least:
   receive a first database request from a client driver;
   generate a second database request based, at least in part, on translating the first database request;
   send the second database request to a storage subsystem of a distributed database; and
   in response to receiving an error message generated by the storage subsystem in response to the second database request:
      determine whether the second database request can be retried based, at least in part, on the error message;
      resend the second database request on behalf of the client driver in response to determining that the second database request can be retried;
      receive a first response in a first format from the storage subsystem in response to the resent second database request;
      translate the error message into a second format expected by a database client associated with the client driver, the second format different than the first format, in response to determining that the second database request cannot be retried; and
      send a second response, in the second format, to the client driver based, at least in part, on the translated error message or translating the first response from the first format to the second format.

17. The non-transitory computer-readable storage medium of claim 16, wherein resending the second database request causes a control plane to reattempt an operation.

18. The non-transitory computer-readable storage medium of claim 16, wherein resending the second database request is performed until a first of an expiration of a predetermined time period or a successful completion of the resent second database request.

19. The non-transitory computer-readable storage medium of claim 16, wherein resending the second database request is performed using an exponential backoff algorithm.

20. The non-transitory computer-readable storage medium of claim 16, wherein the error message is a first error message, the first response is a second error message, and the executable instructions, in response to being executed by the one or more processors, further cause the computing device to at least:
   generate a third error message based, at least in part, on translating the second error message from the first format to the second format; and
   sending the third error message to the client driver as the second response.

21. The non-transitory computer-readable storage medium of claim 16, wherein the error message indicates that a provisioned throughput for the distributed database has been exceeded.

22. The non-transitory computer-readable storage medium of claim 16, wherein the first response indicates a successful completion of the resent second database request.

* * * * *